United States Patent [19]
Barry et al.

[11] Patent Number: 5,647,440
[45] Date of Patent: Jul. 15, 1997

[54] FORWARD-FOLDING, WINGED, IMPLEMENT FRAME

[75] Inventors: Alan F. Barry, Fairfax; Harry C. Deckler, Williamsburg, both of Iowa

[73] Assignee: Kinze Manufacturing, Inc., Williamsburg, Iowa

[21] Appl. No.: 589,925

[22] Filed: Jan. 23, 1996

Related U.S. Application Data

[63] Continuation-in-part of Ser. No. 270,053, Jul. 1, 1994, Pat. No. 5,488,996.

[51] Int. Cl.⁶ .................. A01B 49/00; A01B 63/32
[52] U.S. Cl. ............... 172/311; 172/315; 172/324; 172/456; 172/457; 172/458; 172/507; 111/57
[58] Field of Search ................ 172/310, 311, 172/456, 457, 458, 467, 315, 316, 324, 507; 280/412, 413; 111/57

[56] References Cited

U.S. PATENT DOCUMENTS

| | | | |
|---|---|---|---|
| 3,791,673 | 2/1974 | Hornung | 172/311 X |
| 4,137,852 | 2/1979 | Pratt | 172/311 X |
| 4,171,022 | 10/1979 | Applequist | 172/311 |
| 4,319,643 | 3/1982 | Carter et al. | 172/311 |
| 4,364,581 | 12/1982 | Shoup | 172/311 X |
| 4,576,238 | 3/1986 | Spencer | 172/311 |
| 4,763,915 | 8/1988 | Risser | 172/311 X |
| 5,024,279 | 6/1991 | Warner et al. | 172/311 X |
| 5,113,956 | 5/1992 | Friesen et al. | 172/311 |
| 5,232,054 | 8/1993 | Van Blaricon et al. | 172/311 |
| 5,488,996 | 2/1996 | Barry et al. | 172/311 |
| 5,524,712 | 6/1996 | Balmer | 172/311 |

OTHER PUBLICATIONS

"Track Eradicator", Article in Farm Show, The Best of, 1990 Ed.

*Primary Examiner*—Terry Lee Melius
*Assistant Examiner*—Christopher J. Novosad
*Attorney, Agent, or Firm*—Emrich & Dithmar

[57] ABSTRACT

An improved frame for a drawn agricultural implement, such as a planter, includes a telescoping main frame. The main wheel set is mounted to a sliding carriage to support the central main frame, and may be moved between a forward and a rear position. As the main frame extends, the wing sections fold forwardly. When the wing sections in the illustrated embodiment are completely folded, hydraulic cylinders slide the main wheel set forwardly so that the down load on the hitch is reduced for road transport. Conversely, during the unfold cycle, the hydraulic cylinders return the wheel set to the rear position, and the wings are then extended (i.e., unfolded) for field use.

6 Claims, 4 Drawing Sheets

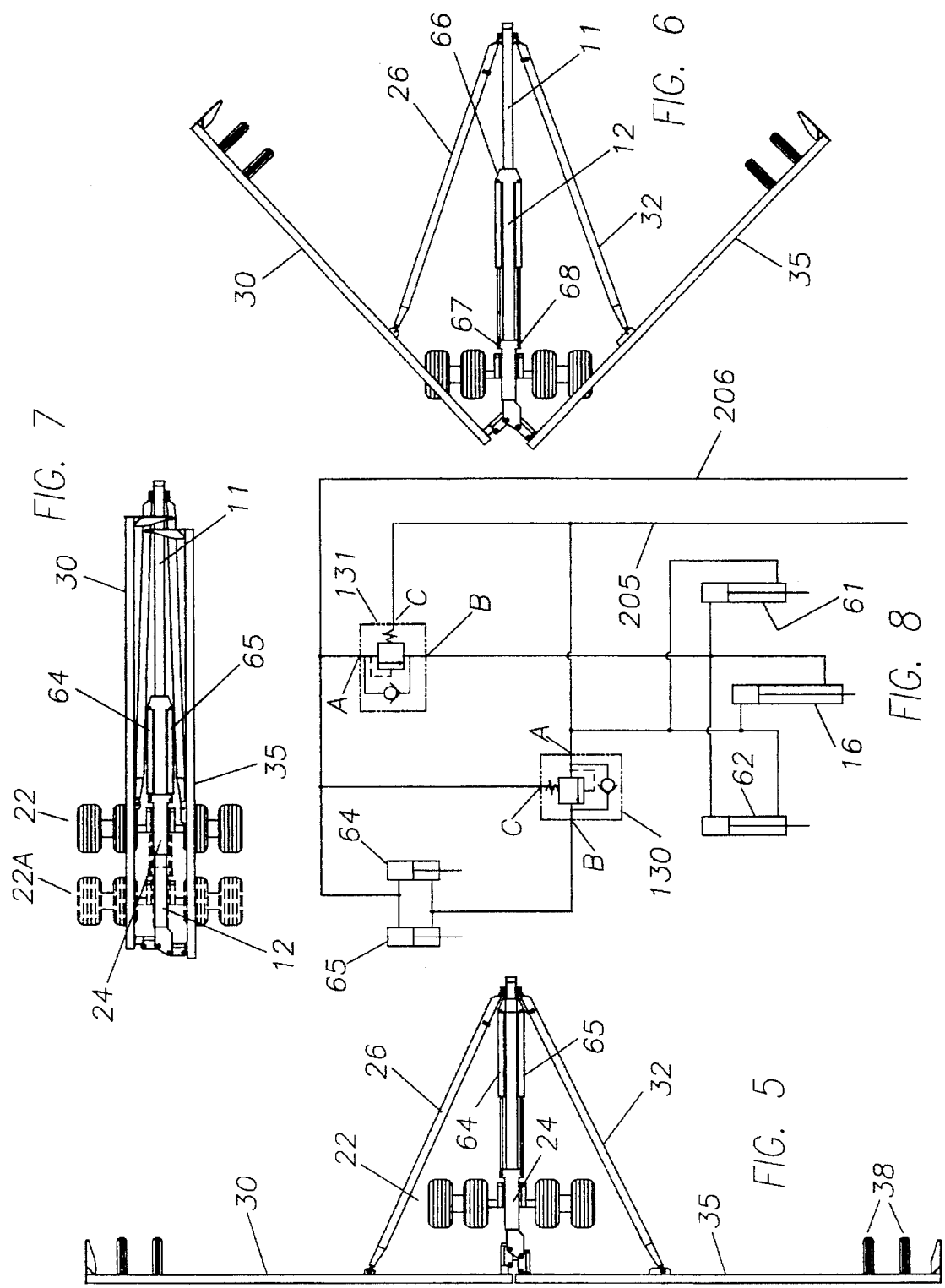

FORWARD-FOLDING, WINGED, IMPLEMENT FRAME

RELATED APPLICATION

This is a continuation-in-part application of application Ser. No. 08/270,053, filed Jul. 1, 1994 entitled "IMPROVEMENTS IN FORWARD-FOLDING, WINGED IMPLEMENT FRAME", (now U.S. Pat. No. 5,488,996 (the "referenced patent")).

FIELD OF THE INVENTION

The present invention relates to agricultural implements, in general; and more particularly, it relates to an improved forward-fold planter.

BACKGROUND OF THE INVENTION

Although the present invention has application to forward-fold implements in general and to agricultural planters other than row crop planters (for example, it has application to grain drills), it will be discussed, for the most part, in connection with a row crop planter. Persons skilled in the art will readily appreciate that grain drills may be mounted on the planter frame in place of the row units, and that other ground-engaging tools, particularly cultivating tools, fertilizer applicators and tillage tools, may be substituted for the row units.

As agricultural planters became larger in width in the planting or field-use position, it became desirable to provide some mechanism to fold the planter for transport or storage. Many proposals have been provided for including, as a part of the main support frame for the implement, wing frames which hinge about their inner ends to swing or "fold" forwardly. That is, the outermost ends of the wing frames swing toward the tractor so that the wings, in the folded position, are parallel to each other and extend in the fore-to-aft direction. Some of these planter frames were provided with a fixed center section mounted to the main wheel set, and first and second wing sections mounted to hinge about the outboard ends of the center section, as in U.S. Pat. No. 4,137,852. In others, the wings extend to the center of the draft frame so that there is no fixed center sections, and the wings pivot about locations near the center of the longitudinal or draft frame, as in U.S. Pat. No. 4,319,643.

Subsequent improvements in forward-fold implement frames (sometimes called "carrier" frames) placed the pivot points for the wing sections at offset locations. That is, one pivot point was located forwardly relative to the other and closer to the centerline of the implement, so that the wing support wheels can be mounted in front of the wing frames in the field-use position; and, when the wings are folded, the wing support wheels interleave with one another due to the offset pivot arrangement. This reduces the transport width and is particularly useful for grain drills and the like, such as are disclosed in U.S. Pat. Nos. 4,763,915 and 5,024,279.

In these prior implement frames having forward-folding wing sections, when the wing sections are folded, the center of gravity of the wing sections is moved forwardly of the main wheel set normally located at the rear of the main, longitudinal frame. Moreover, most forward-fold wing sections provide some arrangement for securing the forward ends of the wing sections in the folded position to the main frame so that the forward ends of the wings, including all units carried by the wings, is supported by the main longitudinal frame. Both of these characteristics (that is, forward shifting of the center of gravity upon folding and supporting the forward ends of the wing sections on the center frame for transport), greatly increase the downward load on the tractor drawbar.

This drawbar loading problem is exacerbated as implements become larger and planters become wider because the folded length likewise becomes longer.

SUMMARY OF THE INVENTION

The present invention is directed to an implement frame structure of the type discussed having a longitudinal center main frame which is extensible (in the illustrated embodiment it is telescopic), by means of an hydraulic cylinder unit. The longitudinal main frame includes a forward telescoping member adapted to be connected to the tractor drawbar, and a rear telescoping member. The extensible frame is retracted for the field position and extended for the transport position so that first and second wing sections, upon which individual planter row units are mounted, can be rotated or folded forwardly.

The main wheel set is mounted adjacent the rear end of the rear telescoping member of the central main frame by means of a carriage capable of sliding along the rear frame member.

First and second fold links are connected at their forward ends to the forward telescoping member of the central main frame, and at their rear ends respectively to intermediate locations on the left and right wing frames so that when the central main frame is extended, the fold links, together with auxiliary hydraulic cylinder units, cause the wings to rotate forwardly to the folded position.

Positioning hydraulic cylinders are mounted between the carriage of the main wheel set and the forward end of the rear, fixed telescoping member of the main frame. These positioning cylinders are arranged such that after the wing sections are folded forwardly by a predetermined amount (fully folded in the illustrated embodiment), the carriage and main wheel set are slid forwardly on the central main frame, thereby reducing the load on the tractor hitch.

During unfolding, the positioning hydraulic cylinders move the wheel set rearwardly first; and then the main cylinders unfold the wing sections so that when the wing sections are fully unfolded, the wheel set is at its rear position and wheels of the central main wheel set are laterally aligned with the wing support wheels.

Thus, the present invention substantially reduces the downward force on the tractor drawbar during the transport position. The structure is suitable for accommodating planter widths of twenty feet or more and up to seventy-five feet or greater without undue load on the tractor hitch, yet all of the support wheels of the implement are in lateral alignment in the use position to facilitate field maneuvering of the implement and to eliminate scuffing of the wheels.

Other features and advantages of the present invention will be apparent to persons skilled in the art from the following detailed description of a preferred embodiment accompanied by the attached drawing wherein identical reference numerals will refer to like parts in the various views.

3

Figure 1:
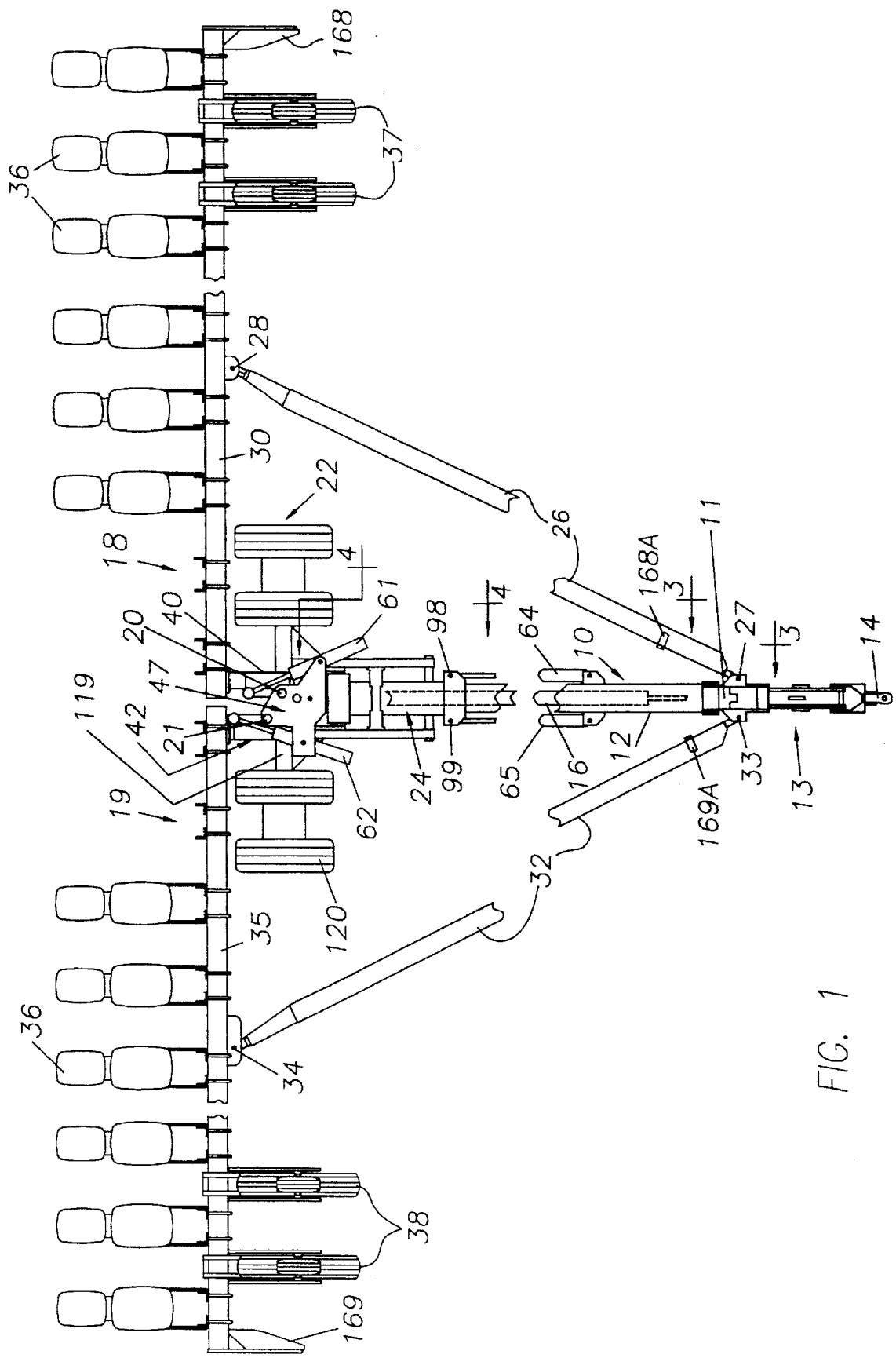
FIG. 1 is a vertical plan view of a forward-folding implement frame constructed according to the present invention, in the extended or field use position, with the center planter units removed for clarity, and with portions of the wing sections, central main frame and draft links broken away to foreshorten the implement.
Figure 2:
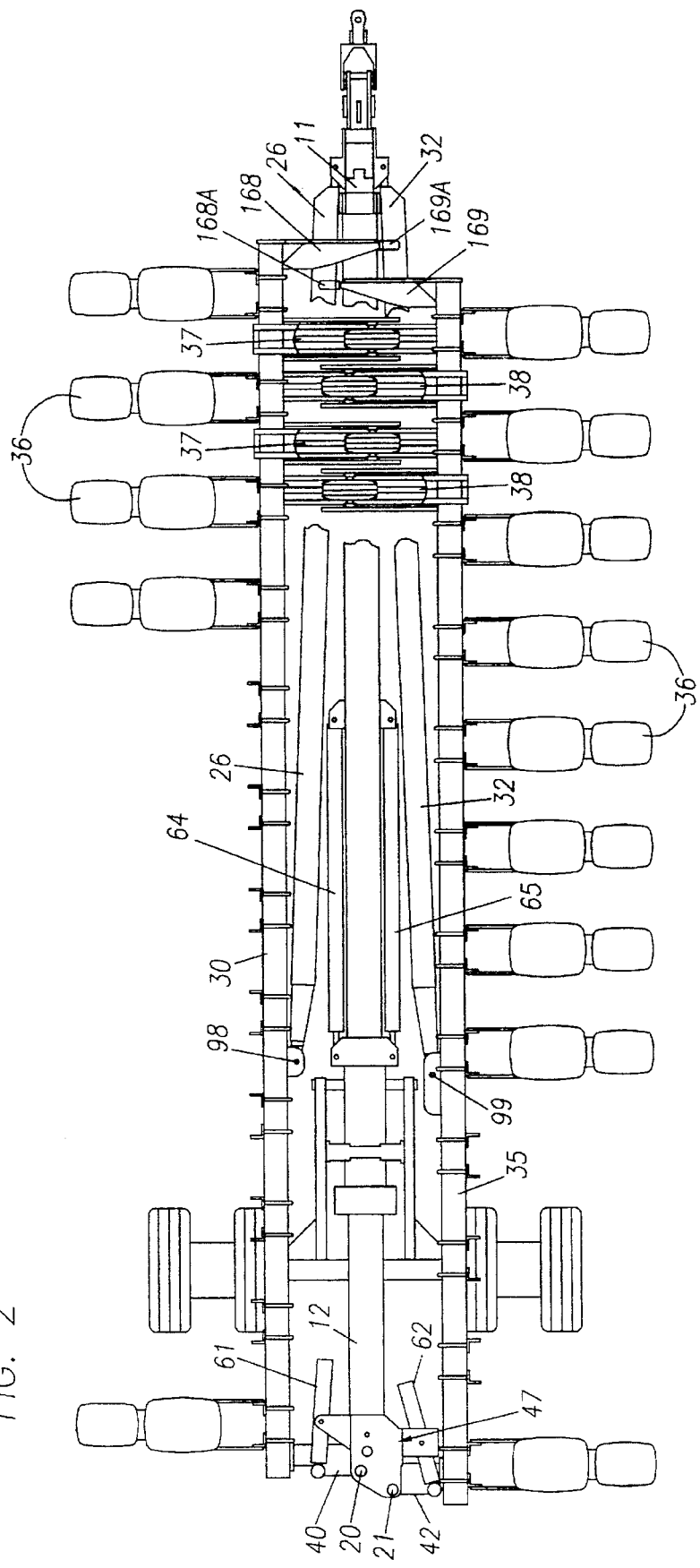
Figure 4:
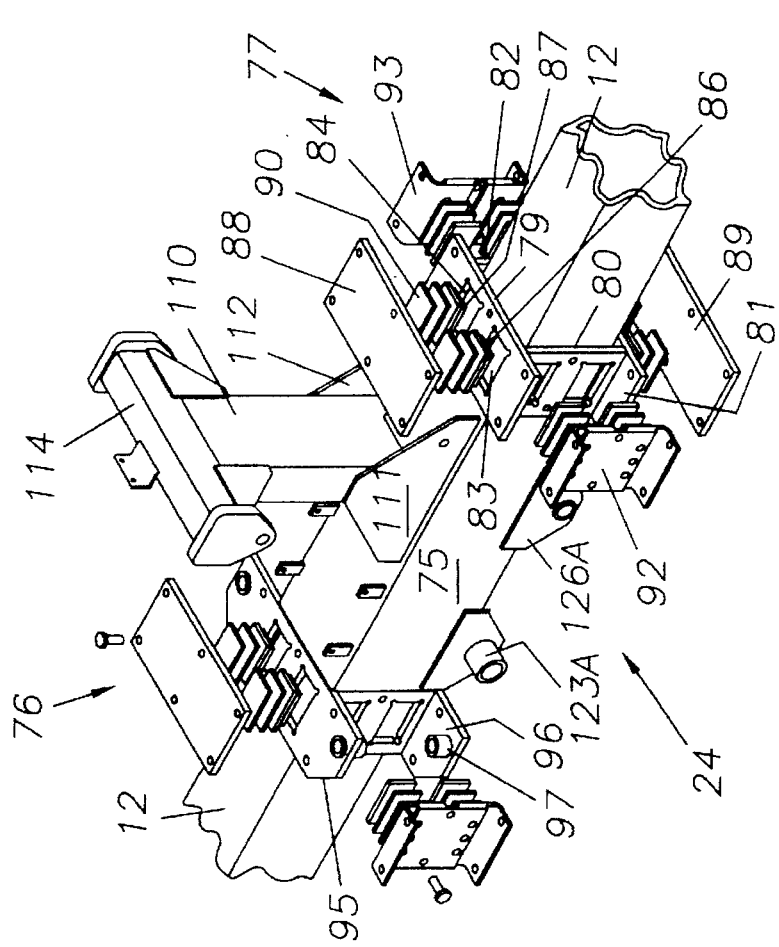
Figure 3:
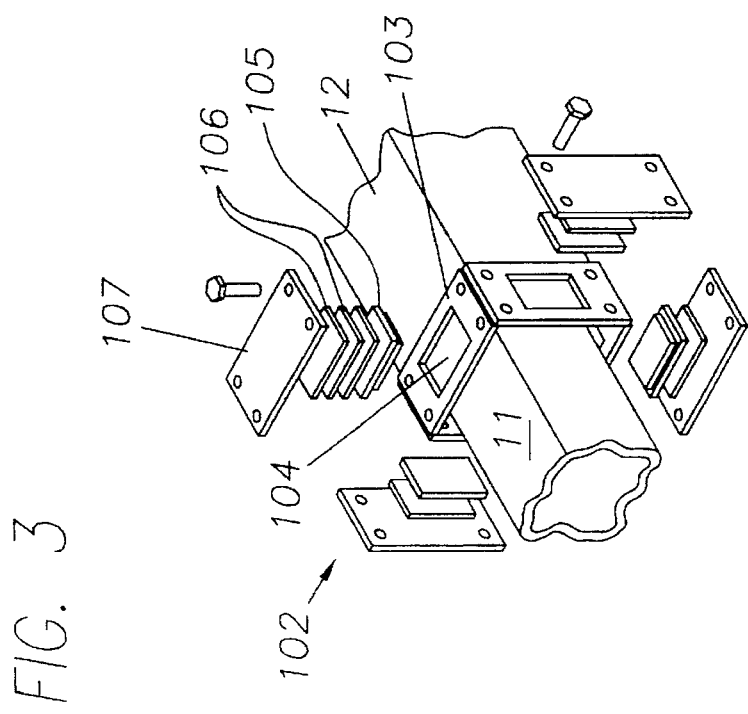

FIG. 2 is a vertical plan view of the implement of FIG. 1 in the folded or transport position, with some of the row units removed for clarity;

FIG. 3 is a fragmentary isometric view, taken from the upper, front, left side of the implement, showing a wear plate and retainer assembly which couples the telescoping members 11, 12 of the central main frame of the implement, with components in exploded relation;

FIG. 4 is a fragmentary isometric view, taken from the upper, rear, left side of the sliding carriage which mounts the main wheel set to the rear telescoping member of the central main frame, together with forward and rear wear plate and retainer assemblies in exploded relation for reducing friction between the sliding members;

FIGS. 5–7 are diagrammatic plan views of the implement frame illustrating the sequence of positions of the wing sections and main wheel set during the folding and unfolding sequences; and FIG. 8 is a schematic diagram of the hydraulic circuit for operating the fold/unfold hydraulic cylinder units.

DETAILED DESCRIPTION OF A PREFERRED EMBODIMENT

Referring first to FIG. 1, the planter includes a longitudinal central main frame 10 in the form of a telescoping tongue having an inner, forward tubular member 11 and an outer, rear tubular member 12. A support and connecting structure, referred to as a "tower" and generally designated 13, is connected to the forward end of the inner tubular telescoping member 11. The tower 13 includes a parallel linkage and hydraulic cylinder unit for connecting (and raising) the forward end of the central main frame to a hitch 14 adapted to connect to a tractor hitch, not shown. The tower 13 is described in more detail in the referenced patent.

A long hydraulic cylinder unit 16 (sometimes called the extension cylinder) has its barrel end connected to the rear end of the outer telescoping member 12, and its rod connected to the forward end of the inner telescoping member 11. Thus, when the hydraulic cylinder unit 16 is extended, the main frame 10 extends, and conversely, when hydraulic cylinder unit 16 is retracted, the main frame retracts.

Left and right wing sections generally designated 18 and 19 respectively are pivotally mounted to the rear of the central main frame for rotation in horizontal planes about pins 20, 21 respectively. As is conventional, the terms "left" and "right" refer to sides of the planter when looking in the direction of travel of the implement which, in FIG. 1, is downward in the plane of the page.

The rear end of the central main frame, as well as the innermost portions of the left and right wing sections 18, 19 are supported by a main wheel set generally designated 22 which is mounted by means of a carriage 24 for controlled, sliding motion along the rear portion of the outer tubular member 12 of the telescoping main frame, as will be described further below.

A brace or link 26 is pivotally connected at 27 to the inner, forward telescoping member 11 of the extensible central main frame, and it is pivotally connected at 28 to an intermediate location of the main tubular frame member 30 of frame of the left wing section 18, which is broken away and foreshortened in FIG. 1. Similarly, a brace or link 32 has its forward end pivotally connected at 33 to the inner tubular member of the extensible main frame, and its rear end pivotally is connected at 34 to an intermediate location on the tubular frame member 35 of the frame of the right wing

4 section 19. The links 26, 32 are referred to as "fold links", although they also perform the function of bracing the wing sections in the open or field use position, as persons skilled in the art will understand.

The tubular frame members 30, 35 of the left and right wing sections are sometimes referred to as toolbars because the ground working tools, in this case individual planter units 36, are mounted to these frame members. The invention, as persons skilled in the art will appreciate, is not limited to the particular row units shown, nor even to row units in general. For example, grain drills, could be mounted to the toolbars 30, 35. Moreover, persons skilled in the art will appreciate that the implement frame of the illustrated embodiment may serve as a carrier frame for other tools such as cultivator sweeps, chisel plows, sprayers, or anhydrous ammonia applicators, if desired. These applications, as well as the manner in which the individual row units are constructed and mounted to the toolbars, are conventional and form no part of the present invention. However, the mounting of the wing support wheels in front of the tubular frame sections 30, 35 does leave the rear of those frames free for mounting tools at any desired spacing over a wide range without interference with support wheels or wheel arms.

In the illustrated embodiment, each wing section includes twelve individual planter row units 36; hence, the planter is a 24-row planter, although some of the units have not been shown, for clarity. The left wing section 18 is supported at its center by the main wheel set 22, and will be described presently, and at its outboard end by two wing support wheel assemblies 37, each including an associated hydraulic lift cylinder unit and linkage. Similarly, the outboard end of the right wing section 19 of the illustrated embodiment is supported by two wing support wheel assemblies 38 and lift cylinder units.

The wing support wheel assemblies may be the same as those described in the referenced patent, and need not be further described here since they form no part of the present invention. The right side wing support wheel assemblies are similar; and persons skilled in the art will appreciate that in the case of a planter, each of the wing wheel assemblies may further include a drive wheel in contact with the associated wing wheel for driving a conventional transmission which supplies power to the seed meters. The drive chain and transmission to the seed meters likewise form no part of the present invention; and they will not be further described.

As described, the left wing section pivots about a pin 20, and the right wing section pivots about a pin 21, as seen in FIGS. 1 and 2. The pin 20 is located forwardly of the pin 21, and closer to the center line of the telescoping main frame 10, which is the center line of the machine. In the field use position shown in FIG. 1, the inboard ends of the wing frames are adjacent, and the axes of the tubular frame member 30, 35 are aligned. The axes of rotation of the wing support wheels 37, 38 are aligned with the wheels of the main wheel set 22. This facilitates maneuvering of the planter in the field, and avoids scuffing of the wing support wheels which can become an operational problem, particularly in large planters.

In the folded position, however, as best seen in FIG. 2, the left wing frame 30 is positioned slightly forwardly of the right wing frame 35. This is due to the fact that the left wing pivot 20 is located forwardly of the right-wing pivot 21. This arrangement enables the support wheels of the left wing section to interleave with the support wheels of the right wing section in the folded position of FIG. 2 to reduce the overall width of the planter in transport.

The wing tubular frames 30, 35 are connected to the rear telescoping tube 12 by means of fabricated structures referred to as "knuckles" and described in the referenced patent.

These knuckles, designated 40 and 42 are mounted to the rear of tube 12 by a main mounting assembly 47 (FIGS. 1 and 2), which includes upper and lower plates welded respectively to the top and bottom walls of the rear telescoping tube 12. The plates are provided with aligned apertures forming journals for the previously described main pivots 20, 21 for the left and right wing sections respectively. The shaft of each wing tube may rotate freely in its associated knuckle to permit the wing to flex vertically about a horizontal axis defined parallel to the direction of travel to follow uneven ground contour. Additional details may be found in the referenced patent.

The wing sections are assisted in their rotational folding motion by first and second assist or auxiliary hydraulic cylinder units 61, 62 for the left and right wings respectively. The barrels of the left and right fold assist cylinder units 61, 62 are mounted at intermediate locations to trunnion brackets which, in turn, are mounted to the main rear mounting assembly 47. The rod ends of the hydraulic cylinder units 61, 62 are pivotally mounted to the rear of the above-mentioned knuckles which are attached to the wing frames respectively for pivoting the wings.

Both the tongue extension hydraulic cylinder unit 16 (acting through the fold links 26, 32) and the fold assist hydraulic cylinders 61, 62 (acting through the knuckles 40, 42) cooperate to open the wing sections for field use and to fold the wing sections for transport. By comparing FIGS. 1 and 2, it can be seen that the extension hydraulic cylinder has maximum leverage (i.e., greatest moment arm) in the field position (FIG. 1) and minimum leverage in the folded position (FIG. 2), whereas the fold assist cylinder units have maximum leverage in the folded position and minimum leverage in the field position. Thus, these two systems supplement each other and cooperate to provide sufficient power to fold and unfold the wing sections in all folding positions.

Left and right hydraulic cylinders 64, 65 are connected between the forward end of the outer telescoping tube 12 and the carriage 24 of the main wheel set 22. The forward ends of the hydraulic cylinder units 64, 65 (which in the illustrated embodiment are the barrels of those hydraulic cylinder units), are pivotally connected to a bracket 66 mounted to the forward end of the outer, rear telescoping member 12; and the distal ends of the rods of the hydraulic cylinder units 64, 65 are pivotally connected to the carriage 24 at 67 and 68 respectively.

Referring particularly to FIG. 4, the carriage 24 includes a tubular sleeve 75 slidably received on the outside of the outer telescoping tube 12. The rods of hydraulic cylinders 64, 65 are connected, as mentioned, to the forward end of the outer tube 12 (which forms a part of the carrier frame) so that when the cylinders are retracted, the sleeve 75 slides forward, and when the hydraulic cylinder units are extended, the sleeve 75 (and the entire main wheel set) are moved rearwardly to the position shown in FIGS. 5 and 6 and in dotted line in FIG. 7.

The tubular sleeve 75 is adapted to slide along the outer surface of the outer telescoping tube 12 by means of forward and rear retainer and wear plate assemblies 76, 77 (FIG. 4) which include bearing or wear plates for reducing friction and facilitating the sliding motion of the carriage along the tube 12. FIG. 4 shows the forward and rear retainer and wear plate assemblies 76, 77 in exploded relation. These assemblies are similar in structure and function so that only one need be described in detail for an understanding of the assembly. However, the forward assembly (76) is different in that it includes bushings for connection to the rod ends of the hydraulic cylinder units 64, 65.

Referring then to the rear retainer assembly 77 as seen in FIG. 4, it includes four mounting plates 79, 80, 81 and 82, mounted respectively to the top, left side, bottom and right side of the tubular sleeve 75 of the carriage 24. Each of the plates 79–82, as can be seen from the plate 79, has a pair of rectangular cut outs, 83, 84. These cut out portions are aligned with corresponding apertures in the sleeve 75, and they are sized to receive respectively wear strips or pads 86, 87. The wear strips 86, 87 are made of bronze for increased wear and reduced friction; and they are held in place by a top retainer plate 88 which is bolted to the top mounting plate 79. The wear strips could be other materials, including plastics, such as Nylatron®. Spacer members such as that designated 90 in FIG. 4 are added, as needed, to achieve the proper spacing of the sleeve 75 of the carriage 24 from the outer surface of telescoping tube 12. A bottom retainer plate 89 similar to the retainer plate 88 is also provided; and left and right U-shaped retainers 92, 93, secure the side wear strips and have their upper and lower flanges bolted respectively to the top and bottom retainer plates 88, 89.

The primary difference between the forward retainer assembly 76 and the rear retainer assembly 77, just described, is that the upper and lower mounting plates, 95, 96 of the forward retainer assembly are extended laterally beyond the side retainer plates to form tabs which are provided with upper and lower bushings, such as the one designated 97 for the left side of the lower mounting plate 96, for receiving pivot pins for mounting the rod ends of the hydraulic cylinders 64, 65 respectively. These pins are designated 98, 99 in FIG. 1.

The forward end of the rear telescoping tube 12 is similarly provided with a retainer and wear strip assembly generally designated 102 in FIG. 3 for slidably receiving the inner telescoping tube 11. In this case, however, each of the four mounting plates is provided with a single cut out so that only one wear plate is provided for each surface of the inner telescoping tube 11; and all of the mounting plates are mounted directly to the corresponding outer surface of the outer telescoping tube 12. The retainer plates are mounted directly to the associated mounting plates. Specifically, an upper mounting plate 103 is provided with a central cut out 104 which receives a wear strip 105. The lower surface of the wear strip 105 is in engagement with the upper surface of the inner telescoping tube 11; and the wear strip 105 is backed by spacers 106, as needed. The outer retainer plate is designated 107 in FIG. 3 for the top wear strip 105.

A vertical pedestal 110 (FIG. 4) is mounted to the top of the sleeve 75 of the carriage, braced by gusset plates 111 and 112. At the top of the pedestal 110 is a cross bar 114 to which the barrels of hydraulic cylinder units are mounted, as described in the referenced patent for raising and lowering the rear end of the telescoping main frame as well as the inboard ends of the wing frames by rotating the main wheel set relative to the frame, as further described in the referenced patent.

The main wheel set 22 includes a horizontal axle assembly generally designated 119 to which four wheels 120 are conventionally mounted. At the center of the axle assembly 119 two struts are mounted; and the upper ends of the struts are pivotally mounted to the tubular sleeve 75 of the carriage. A pivot pin for each strut is received in a sleeve such as the one seen at 123A in FIG. 4. The rod end of hydraulic lift cylinder units are pivotally mounted to the struts. When the hydraulic cylinder units are extended, they are thus constrained to act in unison to raise the tubular sleeve 75, and thus the entire rear end of the telescoping main frame by rotating the struts about the pivot 123. The central lift cylinders have their barrel ends mounted together (by means of the cross bar 114) so that they act in unison in raising the rear end of the telescoping main frame. This is so because each central lift cylinder unit is connected in a master/slave relation with the associated wing lift cylinder units on the same side of the frame. Further details may be obtained from the referenced application.

As seen in FIG. 1, wing latch members 168, 169, each in the form of a downwardly opening hook or latch opening, are mounted respectively at the ends of the left wing frame member 30 and the right wing frame member 35. Stop members 168A, 169A are mounted to the top, inner portion of the wing links 26, 32 respectively. Each of the stop members is in the form of an angle member with a brace. The stop 169A is mounted on the wing brace 32 so as to engage and stop the nose of the left side latch 168, and the stop 168A, on the other hand, is positioned on the fold link 26 to engage and stop the right-hand latch member 169 in the folded position, as seen in FIG. 2.

As disclosed in the referenced patent, an arrangement of linkage and cam is included such that the central main frame and the wings may be raised to an intermediate height position for field turns. The planter may also be raised beyond the field turn position to a transport position.

Folding/Unfolding Operation

Referring now to FIGS. 5-7 and the hydraulic schematic diagram of FIG. 8, the operation of the implement carrier from the field use position of FIG. 5 to the fully folded position (FIGS. 2 and 7) will be described. Hydraulic components shown schematically in FIG. 8 may bear the same reference numerals as the corresponding component previously described. Thus, the main extension hydraulic cylinder unit 16 arranged in the telescoping main frame or tongue 10 and the left and right fold assist hydraulic cylinder units 61, 62 are labelled with corresponding reference numerals, as are the cylinders 64, 65 which move the main wheel set 22 between the forward (transport) position designated 22 in FIG. 7, and the rear (use) position designated 22A in the same figure.

The hydraulic system or circuit receives pressurized hydraulic fluid from the hydraulic system of the tractor and returns fluid to the tractor. The input pressure line is designated 205 and the corresponding return line is designated 206. It will be understood that the fluid flow (and thus the pressure) may be reversed under operator control.

The cylinder or butt end of hydraulic cylinder unit 16 for the telescoping main frame and the rod ends of the fold assist hydraulic cylinder units 61, 62 are connected to input pressure line 205. Line 205 is also connected to an input port (A) of a sequence valve 130, the output of which (B) is connected to the rod ends of the wheel set slide cylinders 64, 65, which are connected in parallel. The drain port (C) of the sequence valve 130 is connected to line 206. The rod end of the main cylinder 16 and the butt ends of the fold assist cylinders 61, 62 are coupled hydraulically to the line 206. Line 206 is also connected to an input port (A) of a sequence valve 131, the output of which (B) is connected to the rod end of the main cylinder 16 and the butt ends of assist cylinders 61, 62. The drain port (C) of sequence valve 131 is connected to line 205.

When the operator elects to fold the machine from the field use position, he actuates a hydraulic lever to pressurize input line 205. Pressurized fluid flows to the butt end of the long extension cylinder 16 to extend the telescoping members 11, 12 of the central main frame. While the central main frame is extending, the operator may drive the tractor slowly forward to facilitate extension. At the same time, hydraulic fluid is fed into the rod ends of the fold assist cylinders 61, 62 to retract them and thereby to help turn the wing frames 30, 35 about their respective rear pivots 20, 21. At this time as well as during the entire fold cycle, the wheel set is in the rear position 22A in FIG. 7 and as seen in FIGS. 5 and 6.

When the main extension cylinder 16 is fully extended and the wings of the planter completely folded, the pressure builds up in line 205 until it exceeds the preset limit in sequence valve 130. As the pressure builds further, the spool of the sequence valve shifts and, at a preset pressure level, causes port (A) to communicate with port (B)—that is, the valve opens. Fluid then flows into the rod ends of the hydraulic cylinders 64, 65, causing them to retract, and moving the main wheel set 22 from the rear position to the forward position. This transfers more weight to the main wheel set, and provides a better distribution of the weight of the planter between the main wheel set and the tractor hitch, and therefore stabilizes the carrier and its implements for road transport. The reason is that the members 168, 169 rest atop the main telescoping frame in the transport mode, and the rear end of the planter is elevated for road travel. Thus, the entire weight of the planter is borne by the tractor hitch and the main wheel set during transport.

The unfold cycle is just the reverse of what has been described in connection with folding. In this case, the line 206 is pressurized, causing the wheel set slide cylinders 64, 65 to extend to move the main wheel set to the rear position 22A. Fluid returns through sequence valve 130 (which has a reverse bypass) to line 205.

After the wheel set is moved to the rear position, the cylinders 64, 65 are at their limits and pressure builds in line 206 until sequence valve 131 opens. Thereafter, pressurized fluid flows into the rod end of the main folding cylinder 16 and the butt ends of the fold assist cylinders 61, 62 to retract the telescoping main frame and cause the links 26, 32, as well as the rear fold assist cylinders to open the wings 30, 35 to the position shown in FIG. 5 for field use.

Although in the illustrated embodiment the folding of the carrier frame is completed before the main wheel set is moved forward, this is merely an example and one described in the illustrated embodiment. However, it is not essential to the invention. The main wheel set could be moved forwardly before or at any time during the folding sequence depending upon the application and the configuration of the implement, as persons skilled in the art will readily appreciate.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. An agricultural implement comprising:
    a main frame including a forward frame member adapted to connect to a hitch of a draft vehicle and a rear frame member mounted to said forward frame member for relative longitudinal motion between an extended and a retracted position;

a main wheel set comprising a wheel axle and ground support wheels mounted on said main frame for sliding motion therealong between a rear and a forward position;

first and second wing sections pivotally mounted at their respective inboard ends to said main frame for swinging movement between a field use position in which said wing sections are aligned in a direction transverse of the direction of travel, and a folded position in which said wing sections are generally parallel to each other and extend in the direction of travel;

first and second folding links, each having a forward end connected to said forward frame member and a rear end connected to said first and second wing sections, respectively, whereby as said main frame is extended, said wing sections pivot forwardly to said folded position and as said main frame is retracted, said wing sections are rotated to said field use position; and power means including at least a first linear power actuator connected to said main wheel set for moving said main wheel set between said rear position when said implement is unfolded for field use, and a forward position when said implement is folded for transport, thereby to distribute the weight of said wing sections more evenly between said wheel set and said tractor hitch during transport.

2. The apparatus of claim 1 wherein said forward and rear frame members of said main frame are in telescoping relation, said apparatus further including a carriage mounted for sliding motion on said rear frame member of said main frame in a fore-and-aft direction, and means for mounting said wheel axle to said carriage for supporting the rear end of said main frame.

3. The apparatus of claim 2 wherein said first linear power actuator comprises a first hydraulic cylinder unit and said power means for sliding said main wheel set further comprises a second hydraulic cylinder unit, each of said first and second hydraulic cylinder units extending lengthwise of said main frame and each having one end connected to said main frame and a second end connected to said carriage.

4. The apparatus of claim 3 wherein said first and second hydraulic cylinder units are each connected to said rear frame member of said main frame.

5. The apparatus of claim 3 further comprising an hydraulic circuit characterized in actuating said first and second hydraulic cylinder units to move said wheel set to said forward position after said telescoping main frame members have begun extending toward a transport position during a fold cycle for said wing sections.

6. The apparatus of claim 5 wherein said hydraulic circuit is further characterized in actuating said first and second hydraulic cylinder units to move said main wheel set to said rear position before retracting said telescoping main frame members for field use during an unfold cycle.

* * * * *